United States Patent [19]
Barbier et al.

[11] Patent Number: 5,479,279
[45] Date of Patent: Dec. 26, 1995

[54] OPTIMIZED COLOR DISPLAY DEVICE WHICH USES A MATRIX TO CONTROL THE HUE AND USES A MATRIX TO CONTROL COLOR SATURATION

[75] Inventors: Bruno Barbier, Bordeaux; Jean-Claude Ebert, St Medard en Jalles; Patrick Lach, Bordeaux; Jean-Blaise Migozzi, Sevres, all of France

[73] Assignee: Sextant Avionique, Meudon La Foret, France

[21] Appl. No.: 296,101

[22] Filed: Aug. 25, 1994

[30] Foreign Application Priority Data

Sep. 7, 1993 [FR] France ................................. 93 10619

[51] Int. Cl.$^6$ .................................................. G02F 1/133
[52] U.S. Cl. ............................................................ 359/53
[58] Field of Search ................................ 359/53, 48, 50

[56] References Cited

U.S. PATENT DOCUMENTS

| | | | |
|---|---|---|---|
| 4,019,808 | 4/1977 | Scheffer | 350/160 |
| 4,416,514 | 11/1983 | Plummer | 359/64 |
| 4,735,473 | 4/1988 | Migozzi et al. | 350/3.7 |
| 4,758,818 | 7/1988 | Vatne | 359/53 |
| 4,810,056 | 3/1989 | Migozzi et al. | 350/131 |
| 4,830,464 | 5/1989 | Cheysson et al. | 350/174 |
| 4,874,214 | 10/1989 | Cheysson et al. | 350/37 |
| 4,983,015 | 1/1991 | Bourguignat et al. | 350/96.25 |
| 5,053,764 | 10/1991 | Barbier et al. | 340/793 |
| 5,057,744 | 10/1991 | Barbier et al. | 315/10 |
| 5,076,664 | 12/1991 | Migozzi | 359/630 |
| 5,124,821 | 6/1992 | Antier et al. | 359/14 |
| 5,142,388 | 8/1992 | Watanabe | 350/50 |
| 5,153,774 | 10/1992 | Migozzi et al. | 359/633 |
| 5,170,153 | 12/1992 | Migozzi et al. | 340/705 |
| 5,239,293 | 8/1993 | Barbier | 340/784 |
| 5,313,054 | 5/1994 | Lach et al. | 250/206.2 |

FOREIGN PATENT DOCUMENTS

| | | |
|---|---|---|
| 0138454 | 4/1985 | European Pat. Off. ............ 359/53 |
| 0541128A1 | 5/1993 | European Pat. Off. . |
| 3167520 | 7/1991 | Japan ............................ 359/48 |

OTHER PUBLICATIONS

Bos, P., et al.; "A Full–Color Field–Sequential Color Display", Proceeding of the Society for Information Display (SID); vol. 26, No. 2, 1985, Los Angeles, pp. 157–161.

Pollack, J. M., et al.; "Liquid Crystal Color Shutter Operation and Applications", Proceedings of the Society for Information Display (SID); vol. 27, No. 4, 1986, Los Angeles, pp. 257–259.

Primary Examiner—William L. Sikes
Assistant Examiner—James A. Dudek
Attorney, Agent, or Firm—Oblon, Spivak, McClelland, Maier & Neustadt

[57] ABSTRACT

The device includes a source of white images, a liquid crystal matrix to control the hue and a liquid crystal matrix to control the saturation of the images displayed.

29 Claims, 2 Drawing Sheets

OPTIMIZED COLOR DISPLAY DEVICE WHICH USES A MATRIX TO CONTROL THE HUE AND USES A MATRIX TO CONTROL COLOR SATURATION

BACKGROUND OF THE INVENTION

The present invention concerns an optimized color display device.

The visual appearance at each point in a color image is entirely defined by three independent parameters: luminance, hue and saturation, the last two determining the color of the point concerned. Perception by the human eye of variations of luminance is quite different from that of variations of color in space and time.

Traditional display systems do not provide for separate control of the luminance and the color; consequently, they are poorly adapted to our different perceptions of luminance and color.

There are two ways of forming a color image, the first known as "additive" and the second as "subtractive".

Systems using the additive method modulate the respective luminous intensities of three separate beams each of constant color, then superimpose these beams. These three distinct colors are known as primary colors; they are often, for example, red, green and blue. Several techniques for taking into account the colors of neighboring points in an image are known in order to perform additive mixing: spatial average of neighboring elements, time average, spatial superimposition.

The visual appearance of each point in the image is controlled by modifying the intensities of each of the three primary beams; the ratios of these intensities then determine the visual color of the point; the sum of these three intensities determines the luminance of the point. To modify only the luminance of a point, without modifying its color, the luminous intensities of the three primary beams must be modified. Similarly, to modify only the color, without modifying the luminance, the luminous intensities of the three primary beams must again be modified.

In systems using the subtractive method, the three parameters modulated are the respective levels of transmission of three bandpass filters of fixed color traversed successively by a beam which is originally white. These three distinct colors are, for example, the complementary colors of the three primary colors mentioned earlier: cyan, magenta and yellow.

We control the visual appearance of each point in the image by modifying the transmission level of each of the three filters. To modify only the luminance of a point, without modifying its color, the level of transmission of the three filters must be modified. Similarly, to modify only the color, without modifying the luminance, the level of transmission of the three filters must again be modified. Another disadvantage of subtractive systems is that the maximum value of the transmitted intensity is limited by the fact that each filter always absorbs at least one spectral band.

The control of color image systems, whether additive or subtractive, therefore consists in using several spectral bands at predetermined positions in the visible spectrum, modulating them in varying proportions, then adding them to or subtracting them from the incident beam of light from the light source. These systems do not enable direct control of the color without modifying the luminance, nor of the luminance without modifying the color. One of the consequences is that the definitions of the luminance and the color of images points are the same, in other words, for a given image, the maximum number of luminance components in image points is the same as the maximum number of color components in image points, or the maximum spatial frequency of modulation of the luminance, at constant color, that the system can reproduce correctly is equal to the maximum spatial frequency of modulation of the color, at constant luminance, that the system can reproduce correctly.

Unfortunately, human visual performance, in terms of spatial frequencies in particular, is not very compatible with the techniques used in known image synthesis systems: visual acuity is much keener for luminance than for color. Known systems are not therefore well adapted to the characteristics of human vision.

SUMMARY OF THE INVENTION

The object of the invention is a color image display device which can be optimally adapted to the performance of human vision—and even to the vision of each individual viewer.

The display device according to the invention includes, in cascade, a device to control the luminance of the images displayed, a device to control the hue of the images, and a device to control the saturation of the images.

BRIEF DESCRIPTION OF THE DRAWINGS

Other characteristics and advantages of the present invention will become apparent on read the following description of a preferred embodiment, with reference to the attached drawings.

DESCRIPTION OF THE PREFERRED EMBODIMENT

Figure 1:
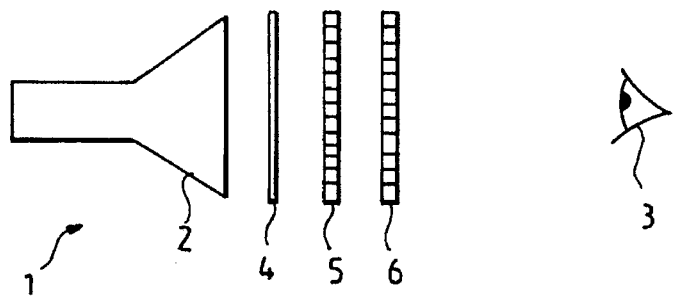
FIG. 1 shows an exploded, simplified drawing of a first embodiment, using a cathode ray tube, a polarizer and two control devices.

FIG. 1 shows in simplified form the display device according to the invention. This device includes, moving from the image source 2 to the eye of the observer 3, a polarizing device 4, a hue control device 5 and a saturation control device 6. The polarizing device 4 is, for example, a spectrally neutral linear polarizer, but it could be a spectrally neutral circular polarizer. It should be noted, however, that the order of the devices 4 to 6 is not necessarily that indicated above: they could be permuted in most embodiments.

The source 2 supplies, in a known way, a white image (levels of gray) polarized by the polarizer 4. The device 5 is a liquid crystal optical valve which splits the light from the source 2 along two perpendicular polarization axes and into two complementary colors whose hue (dominant wavelength) depends on the control voltage applied to the optical valve.

The device 6 is a liquid crystal optical valve which suppresses a variable fraction of the light it receives along one of the two polarization axes mentioned previously (or, if the polarizer 4 is a circular polarizer, along one direction of polarization).

Thus the device 2 affects only the luminance, whereas the devices 5 and 6 affect essentially the color and only partially the luminance: the device 5 affects the hue (dominant wavelength) and the device 6 affects the saturation.

Thus, components 2 and 4 provide a white polarized image by acting only on the luminance. The component 5 splits this light along two perpendicular polarization axes (x and y) and into two complementary colors whose hue (dominant wavelength) depends on the control voltage applied to this component. The component 6 suppresses a variable fraction of the light it receives from 2 and 4 via 5, affecting essentially the color of the image displayed, and partially the luminance. In the example described, the component 5 affects the hue (dominant wavelength), whereas the component 6 affects the saturation of the image displayed.

Consequently the device according to the invention enables the characteristics of each of the electro-optical devices 2, 5 and 6 to be separately adapted so as to optimize the image formed by the display device 1 with respect to human vision. This optimization consists in adjusting the following parameters separately for the luminance, the hue and the saturation: contrast, definition, number and spacing the quantified levels of the points of the displayed image, refreshment frequency, and rise times of the image parameter control signals.

The device according to the invention enables, in particular, an "over-definition" of the color parameter to be avoided. Thus, for example, for an image defined in the traditional way with N lines of N pixels per line, there are $3N^2$ pixels to be modulated. It is quite possible, without perceptibly affecting the quality of the displayed image, to divide by two, on each axis (lines and columns), the definition of the hue and of the saturation, which then reduces the number of pixels to be modulated to $1.5N^2$.

Moreover, this diminution of the definition of the optical valves modulating the hue and saturation significantly increases their optical transparency and thereby increases the energy efficiency of the display device.

The cathode ray tube 2 is of the white phosphor type, the image to be viewed being formed on its screen. This cathode ray tube emits a white light spatially modulated in intensity. This light contains the colors red, green and blue.

The polarizer is, for example, a neutral linear polarizer acting along the y axis (vertical). This polarizer absorbs half the light energy of the tube 2. If $L(\lambda)$ represents the spectral luminance of one of the three primary light rays emitted by the tube 2, the spectral luminance of the light transmitted by the polarizer 4 is then $0.5\ L(\lambda)$.

The effect of the matrix 5 is to modify at each crossover point of its network the spectral distribution of light energy along the two perpendicular polarization axes x and y of the matrix as a function of the potential applied at each of these points. The matrix 5 includes liquid crystal molecules whose individual orientations are controlled electrically, by controlling the potential applied to the respective electrodes corresponding to the crossover concerned. The axis of these molecules represents the "extraordinary" axis of the liquid crystal layer.

For an incident luminous intensity (polarized by the polarizer 4) along the y axis and having luminance $0.5\ L(\lambda)$, the light energy at the output from matrix 5, along each polarization axis, is given by:

$$Lx(\lambda)=0.5L(\lambda)\sin^2(k/\lambda)$$

$$Ly(\lambda)=0.5L(\lambda)\cos^2(k/\lambda)$$

where $L(\lambda)$ is the spectral luminance emitted by the cathode ray tube, $\lambda$ is the wavelength, $Lx(\lambda)$ is the spectral luminance along the x axis, $Ly(\lambda)$ is the spectral luminance along the y axis and k is a coefficient which is a function of the potential applied to the crossover of matrix 5 concerned.

This phenomenon of the modification of the spectral distribution of the incident light energy is due to a nematic liquid crystal in which the axis of the first molecules encountered by the light rays penetrating the matrix 5 is oriented 45° to the y axis (the axis of the molecules behind, in the direction of the thickness, being at an angle different from 45°).

When no potential is applied, the coefficient k is a function of the product of the thickness of the liquid crystal cell and the value of the birefringence. When a high potential is applied to the cell, the axis of the liquid crystal molecules is aligned along the direction of propagation of the light (z axis). The plane of polarization of the light remains unchanged and correspond to s the null value of k.

For intermediate values of the potential applied to the cell takes values between 0 and the abovementioned value when there is no potential.

Owing to the fact that the light from the cathode ray tube 2 is white, the colors of the light energies associated respectively with the polarization axis x and the polarization axis y are complementary.

A matrix such as 5 operates according to the principle commonly known as electrically controlled bifringence.

The liquid crystal matrix 6 analyzes the light (like an "analyzer" filter) with a degree of polarization which can be electrically controlled. When no potential is applied to matrix 6 the light energy transmitted by the matrix is that of the polarization axis y. When a high potential is applied to the matrix 6 it transmits 100% of the light; the hue of the image formed by the tube 2 and observed behind the matrix 6 is that of the tube 2, i.e. white. For intermediate values of the potential applied to matrix 6 the light energy is transmitted without loss along the y axis and partially along the x axis. The latter component along the x axis is given by:

$$Lt(\lambda)=[a(V).Lx(\lambda)]+Ly(\lambda)$$

where $a(V)$ is a transmission coefficient between 0 and 1 which is a function of the potential applied to matrix 6 ($a(0)=0$ and $a(\infty)=1$).

In this way, when the potential V is varied, we can scan the range of colors from white to the color associated with the polarization axis y. This phenomenon can be explained as follows. The liquid crystal contains colorant molecules, generally neutral from a spectral point of view, aligned along the x axis and absorbing light energy along this axis. We modify the transmission coefficient of the molecules by inclining their axis in the direction of propagation of the light using an electric potential applied to the matrix. Such a matrix, nematic with colorant molecules, is known as a "guest host".

Figure 2:
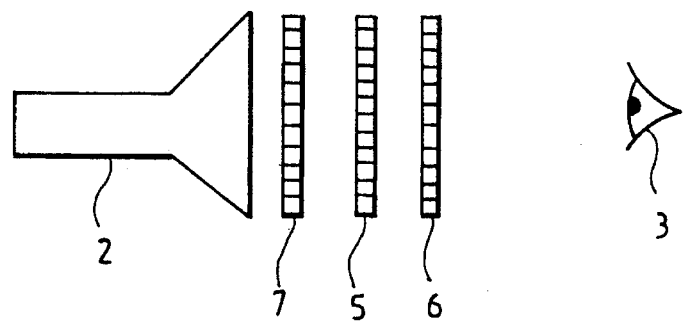
FIG. 2 shows an exploded, simplified drawing of a second embodiment, similar to the first, in which the polarizer is replaced by a control device.

In a second example of an embodiment of the invention, shown in FIG. 2, we use a device including, as in FIG. 1, a cathode ray tube 2 with white phosphors, a first matrix 5 and a second matrix 6, but in which the polarizer 4 has been replaced by a third matrix 7. This third matrix 7, identical to matrix 6, is a variable polarization matrix. The transmission by matrix 5 of depolarized light is spectrally neutral. If we removed matrix 7 and if we controlled matrix 6 in nonpolarizing mode (high potential applied to matrix 6), the set of matrixes 5 and 6 would have an overall transmission of 100% and be spectrally neutral. Therefore, with the matrix 7, controlled to have variable polarization, the transmission of light energy emitted by the tube 1 can be improved compared with the device in FIG. 1, while remaining spectrally neutral. In the case of the two matrixes 7 and 6, which are identical and modulated by the same voltage V, the light flux Lt transmitted by the set of matrixes 7, 5 and 6 is a function of the variable transmission coefficient of these matrixes, and is given by:

$$Lt(\lambda)=0.5L(\lambda)[(1+a^2(V).\cos^2(k/\lambda)+2a^2(V)\sin^2(k/\lambda)$$

In this equation, the coefficient a(V) depends on the state of the two matrixes 7 and 6 whose transmission coefficients are variable (since the degree of polarization is varied); the value of this coefficient a(V) ranges from 0 to 1.

With the device shown in FIG. 2 we double the transmission of light energy compared with that in FIG. 1 when the color of the image viewed behind the matrix 6 is identical to that of that produced by the cathode ray tube 2 (generally white color), in which case a(V)=1. For highly unsaturated colors, we increase significantly the overall transmission of the image display device, compared with the device in FIG. 1, since the energy from the source is practically completely recuperated on one of the polarization axes and partially on the other, depending on the degree of saturation of the colors.

For saturated colors, i.e. those for which a(V)=0, or those which are farthest from white as regards saturation, the transmission of light energy is not lower than in the first embodiment.

For intermediate colors (between white and complete saturation), the rate of transmission of the set of matrixes is between 1 and 2 times that of the first embodiment, depending on the degree of saturation of the color displayed.

Figure 3:
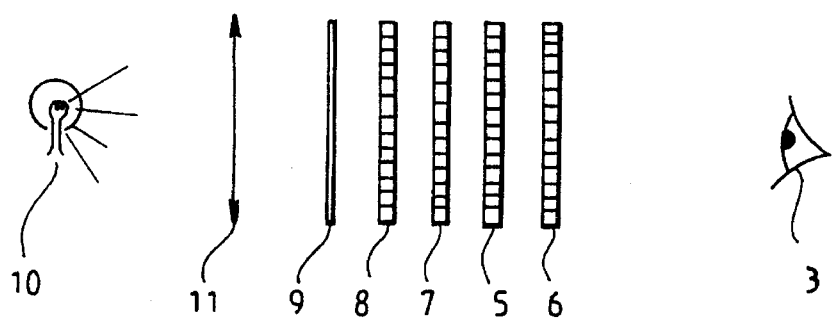
FIG. 3 shows an exploded, simplified drawing of a third embodiment, similar to the first, in which the cathode ray tube is replaced by a matricial optical valve with backlighting from a luminous source.

In the example of an embodiment shown in FIG. 3 which includes the set of matrixes 7, 5, 6, the cathode ray tube has been replaced by a matricial optical valve 8 with spectrally neutral liquid crystals. This valve can be, for example, a helical nematic liquid crystal matrix used with a neutral linear polarizer 9 which can precede it. Preferably, this matrix 8 is back-lit by a light source 10, preferably white, and preferably via a collimator 11.

In the embodiment in FIG. 3, owing to the fact that the image source 8 is a spectrally neutral optical valve, we can completely invert the order of the components so that, instead of seeing the order 10, 11, 9, 8, 7, 5, 6, we can have the order 10, 11, 6, 5, 7, 8, 9 (component 9 then being closest to the observer).

In the embodiments described above, the essential components of the display device (image source, matrixes and the possible polarizer) are very close to each other and can even be touching.

Figure 4:
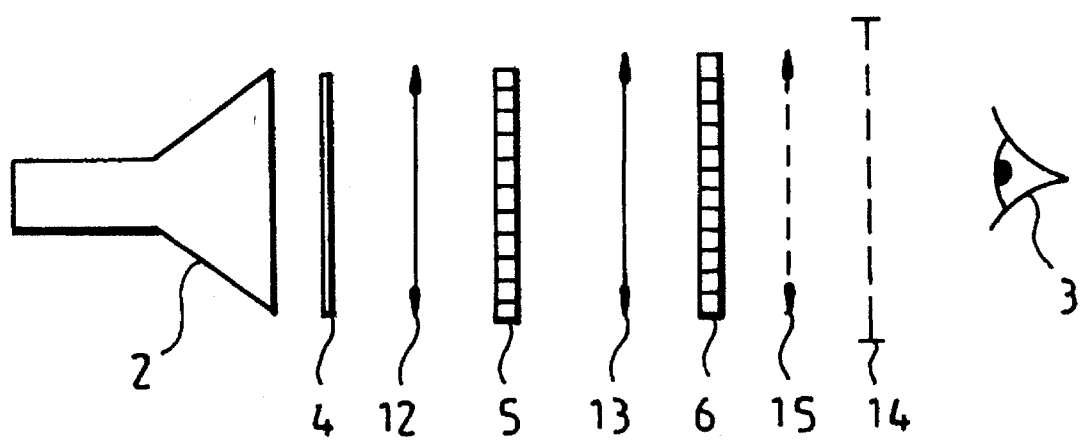
FIG. 4 shows an exploded, simplified drawing of a fourth embodiment, similar to the first, in which connecting optics are used.

It is possible, however, as shown schematically in FIG. 4, to separate them widely and couple them optically using optical connecting components.

In the example in FIG. 4 we find the same components as in FIG. 1: components 2, 4, 5 and 6, with the eye of the observer 3. It is of course understood that we could also use the components of the other embodiments described above and inverse the order of the components, as mentioned earlier.

Only the polarizer 4 and the tube 2 are close to each other or touching each other; the components 5 and 6 are at a distance from each other and from the polarizer 4. A first connecting optic 12 is placed between the components 4 and 5 and a second connecting optic between components 5 and 6. The optic 12 connects the image source 2 with the matrix 5, whereas the optic 13 connects the component 5 and the image source 2 with the component 6. The connecting optics can be conventional and have magnification 1 or different from 1 (for example, traditional objective lenses of photographic devices) or any suitable image transmitting device, for example, fiber optics, which is advantageous for example when the different matrixes must be close to each other. Of course, we can eliminate one of the two connecting optics (12 or 13) if the components between which they would have been placed are very close to each other.

If the position of the observer relative to the display device described above varies little in all cases of use, the observer can observe directly the image produced by the device.

On the other hand, if the position of the observer can vary significantly, we place a translucent screen 14 before the device described above and a connecting optic 15 between the component 6 and the screen 14 (the components 14 and 15 are shown as hatched lines in FIG. 4). The display device including the extra components 14 and 15 also has another advantage. The incidence of light rays (relative to the screen 14) which contribute to the formation of the image seen by the observer 3 does not vary along the path between the screen 14 and the source 2, when the position of the observer relative to the screen changes. We therefore eliminate any parallax error between the pixels corresponding to each of the components 2, 5 and 6 when the position of the observer varies (given, of course, that the components 5 and 6 are well aligned and that the optics 12, 13 and 15 are correctly placed), and we also eliminate any variation of color of the pixels of each of the components 5 and 6 when the position of the observer changes.

Consequently the device according to the invention can be compact (embodiments shown in FIGS. 1 to 3) while providing high optical transmissivity.

What is claimed is:

1. Color image display device whose image parameters can be optimized, in particular with respect to human visual acuity, which includes in cascade to a light beam, a device to control a luminance of displayed images, a liquid crystal device to control a hue of the displayed images depending on an electrical signal applied thereto which changes an orientation of the liquid crystal therein, and a device to control a saturation of the dismayed images.

2. Device according to claim 1, wherein said device to control the luminance of the displayed images is a cathode ray tube.

3. Device according to claim 2, wherein said cathode ray tube has white phosphors.

4. Device according to claim 1, wherein said device to control the luminance of the displayed images includes a matricial optical valve.

5. Device according to claim 4, wherein said optical valve is spectrally neutral.

6. Device according to claim 4, wherein said optical valve is a helical nematic liquid crystal optical valve.

7. Device according to claim 6, wherein said optical valve is associated with a neutral polarizer.

8. Device according to claim 4, wherein said optical valve is back-lit by a collimated light source.

9. Device according to claim 8, wherein said light source is a white light source.

10. Device according to claim 1, wherein said devices to control the hue of the images and to control the saturation of the images each include a liquid crystal matrix controlled by a variable electrical voltage.

11. Device according to claim 10, which also includes a spectrally neutral polarizer.

12. Device according to claim 10, which also includes a third liquid crystal matrix of variable polarization.

13. Device according to any of the previous claims, which includes at least one connecting optic associated with the said devices to control the hue of the images and to control the saturation of the images.

14. Device according to claim 1, which includes a translucent screen.

15. Device according to claim 14, in which said translucent screen is associated with a connecting optic.

16. A color display device, comprising, arranged along a light path:

a variable intensity light source;

a first variable polarizer, which splits light input thereto into light having two perpendicular polarization axes and two complementary colors; and a second variable polarizer, which suppresses light along one of said two polarization axes.

17. A color display device according to claim 16, wherein said variable intensity light source is a white light source.

18. A color display device according to claim 17, wherein said variable light source includes a cathode ray tube.

19. A color display device according to claim 17, wherein said variable intensity light source includes a liquid crystal light valve back-lit by a light source.

20. A color display device according to claim 16, wherein said variable intensity light source includes a polarizer, different from said first and second variable polarizers.

21. A color display according to claim 20, wherein:

said polarizer of the variable intensity light source is a spectrally neutral polarizer.

22. A color display according to claim 21, wherein:

said polarizer of the variable intensity light source is a fixed polarizer.

23. A color display according to claim 21, wherein:

said polarizer of the variable intensity light source is a variable polarization matrix.

24. A color display according to claim 20, wherein:

said polarizer which is different from the first and second variable polarizers polarizes light along a first direction;

said first polarizer polarizes light along the first direction and a second direction which is perpendicular to the first direction; and said second polarizer filters light which is polarized along the first direction.

25. A color display according to claim 16, further comprising:

connecting optics between each of the variable intensity light source, the first variable polarizer, and the second variable polarizer.

26. A color display according to claim 16, wherein:

said first variable polarizer is different from said second variable polarizer;

said first variable polarizer is a first variable polarization means for primarily controlling hue; and said second variable polarizer is a second variable polarization means for primarily controlling saturation.

27. A method of generating a color display, comprising the steps of:

generating light along a path;

variably polarizing the light along the path into light having two perpendicular polarization axes and two complementary colors; and variably polarizing the light along the path in order to suppresses light along one of said two polarization axes.

28. A method according to claim 27, wherein:

the step of variably polarizing the light along the path into light having two perpendicular polarization axes is primarily for controlling hue; and the step of variably polarizing the light along the path to suppress light is primarily for controlling saturation.

29. A method according to claim 28, wherein said step of generating light generates white light which is controllable for individual pixels of said color display.

* * * * *